United States Patent
Nemoto et al.

(10) Patent No.: US 9,346,915 B2
(45) Date of Patent: May 24, 2016

(54) METHOD FOR PRODUCING POLYMER AND DEVICE FOR PRODUCING POLYMER

(71) Applicants: Taichi Nemoto, Shizuoka (JP); Chiaki Tanaka, Shizuoka (JP)

(72) Inventors: Taichi Nemoto, Shizuoka (JP); Chiaki Tanaka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/372,621

(22) PCT Filed: Jan. 25, 2013

(86) PCT No.: PCT/JP2013/052291
§ 371 (c)(1),
(2) Date: Jul. 16, 2014

(87) PCT Pub. No.: WO2013/121893
PCT Pub. Date: Aug. 22, 2013

(65) Prior Publication Data
US 2015/0018513 A1    Jan. 15, 2015

(30) Foreign Application Priority Data

Feb. 14, 2012  (JP) ................................. 2012-029282
Aug. 31, 2012  (JP) ................................. 2012-191183

(51) Int. Cl.
*C08G 63/78*   (2006.01)
*C08G 63/08*   (2006.01)
*B01J 19/24*   (2006.01)

(52) U.S. Cl.
CPC ............... *C08G 63/78* (2013.01); *B01J 19/242* (2013.01); *B01J 19/243* (2013.01); *B01J 19/248* (2013.01); *C08G 63/08* (2013.01); *C08G 63/785* (2013.01); *B01J 2219/00135* (2013.01); *B01J 2219/2401* (2013.01)

(58) Field of Classification Search
CPC ...................................................... C08G 63/78
See application file for complete search history.

(56) References Cited

U.S. PATENT DOCUMENTS

| 6,368,725 | B1 | 4/2002 | Graf et al. |
| 8,524,437 | B2 | 9/2013 | Yamauchi et al. |
| 2004/0072985 | A1 | 4/2004 | Lee et al. |
| 2010/0130676 | A1 | 5/2010 | Suzuki et al. |
| 2011/0218301 | A1 | 9/2011 | Nemoto et al. |
| 2011/0218313 | A1 | 9/2011 | Mase et al. |
| 2012/0129094 | A1 | 5/2012 | Yamauchi et al. |
| 2012/0231165 | A1* | 9/2012 | Belcheva .................. 427/254 |
| 2012/0322005 | A1 | 12/2012 | Tanaka et al. |
| 2014/0163194 | A1 | 6/2014 | Nemoto et al. |
| 2014/0213754 | A1 | 7/2014 | Nemoto et al. |

FOREIGN PATENT DOCUMENTS

| JP | 2002-500238 | 1/2002 |
| JP | 2004-277698 | 10/2004 |
| JP | 2008-001732 | 1/2008 |
| JP | 2008-214388 | 9/2008 |
| JP | 2009-001614 | 1/2009 |
| JP | 2011-208115 | 10/2011 |
| JP | 2011-208116 | 10/2011 |
| JP | 2012-188664 | 10/2012 |
| JP | 2013-216851 | 10/2013 |
| WO | WO 2008/123565 A1 | 10/2008 |
| WO | WO 2013/018873 A1 | 2/2013 |

OTHER PUBLICATIONS

Extended European Search Report issued Feb. 3, 2015 in Patent Application No. 13749202.1.
Fabrice Stassin et al., "Polymerization of (L,L)-Lactide and Copolymerization with ε-Caprolactone Initiated by Dibutyltin Dimethoxide in Supercritical Carbon Dioxide", Journal of Polymer Science Part A: Polymer Chemistry, vol. 43, No. 13, XP055164529, Jul. 1, 2005, pp. 2777-2789.
Rosario Mazarro et al., "Copolymerization of D,L-Lactide and Glycolide in Supercritical Carbon Dioxide With Zinc Octoate as Catalyst", Journal of Biomedical Materials Research Part B: Applied Biomaterials, vol. 85B, No. 1, XP055164527, Apr. 1, 2008, pp. 196-203.
U.S. Appl. No. 14/328,053, filed Jul. 10, 2014 Inventor: Yamauchi, et al.
U.S. Appl. No. 13/805,962, filed Jan. 3, 2013 Inventor: Nemoto, et al.
International Search Report Issued Apr. 16, 2013 for counterpart International Patent Application No. PCT/JP2013/052291 filed Jan. 25, 2013.
Blakey, I., et al., "Controlled polymerisation of lactide using an organo-catalyst in supercritical carbon dioxide", Green Chemistry, 2011, (6 Pages).
Ganapathy, H. S., et al "Ring-opening polymerization of L-lactide in supercritical carbon dioxide using PDMS based stabilizers", European Polymer Journal vol. 43, pp. 119-126, 2007.
"The Latest Applied Technology of Supercritical Fluid (Cho Rinkai Ryutai No Saishin Ouyou Gijutsu)," p. 173, published by NTS Inc. on Mar. 15, 2004 (with Partial English translation).

* cited by examiner

*Primary Examiner* — Kuo-Liang Peng
(74) *Attorney, Agent, or Firm* — Oblon, McClelland, Maier & Neustadt, L.L.P.

(57) ABSTRACT

A method for producing a polymer, including: (i) continuously supplying and bringing at least a first monomer, which is ring-opening polymerizable, and a compressive fluid into contact with each other, to thereby allow the first monomer to carry out ring-opening polymerization to continuously generate an intermediate; and (ii) bringing the intermediate and a second monomer, which is identical to or different from the first monomer in kind, into contact with each other, to thereby allow the intermediate and the second monomer to carry out polymerization.

15 Claims, 2 Drawing Sheets

METHOD FOR PRODUCING POLYMER AND DEVICE FOR PRODUCING POLYMER

TECHNICAL FIELD

The present invention relates to a method for producing a polymer through ring-opening polymerization of a ring-opening polymerizable monomer and to a device for producing a polymer.

BACKGROUND ART

In order to produce, for example, block copolymers, there has conventionally been known a method for producing a polymer where ring-opening polymerizable monomers are polymerized at a plurality of divided stages. In one exemplary disclosed method, D-lactide is polymerized to obtain poly-D-lactic acid, and the poly-D-lactic acid is polymerized with L-lactide, to thereby produce a stereo block copolymer of polylactic acid (see PTL 1). In accordance with the disclosed method, dichloromethane which is an organic solvent is used in each of the step of polymerizing D-lactide and the step of polymerizing L-lactide. When polymerization is performed using an organic solvent, there is a problem in that the organic solvent remains as a waste liquid after the polymerization.

As for a method for polymerizing a ring-opening polymerizable monomer without using an organic solvent, there is disclosed a method for polymerizing lactide in supercritical carbon dioxide (see NPL 1). In accordance with the disclosed method, lactide is polymerized in a procedure including: charging an autoclave with lactide, 1,8-diazabicyclo[5.4.0]undec-7-ene (DBU), and benzyl alcohol; adding carbon dioxide to the autoclave; stirring the mixture at 80° C. and 70 atm; and adding carbon dioxide to the autoclave to turn the pressure to 250 atm. In accordance with this method, a polymer having a number average molecular weight of about 10,000 is obtained by reacting for 16 hours.

CITATION LIST

Patent Literature

PTL 1: Japanese Patent Application Laid-Open (JP-A) No. 2009-1614

Non-Patent Literature

NPL 1: Idriss Blakey, Anguang Yu, Steven M. Howdle, Andrew K. Whittakera and Kristofer J. Thurechta, Green Chemistry, 2011, Advance Article

SUMMARY OF INVENTION

Technical Problem

However, when a ring-opening polymerizable monomer such as lactide is polymerized using a compressive fluid such as supercritical carbon dioxide, it takes a long time to complete polymerization reaction. Therefore, when a ring-opening polymerizable monomer is polymerized at a plurality of divided stages including a stage of polymerizing the ring-opening polymerizable monomer using a compressive fluid, it takes a long time to produce a polymer and thus production efficiency decreases, which is problematic.

The present invention aims to solve the various problems in the art, and achieve the following object. An object of the present invention is to provide a method for producing a polymer, which shortens time required for a first polymerization step and efficiently produces a polymer in a short time when a ring-opening polymerizable monomer is ring-opening polymerized at a plurality of divided stages.

Solution to Problem

A method for producing a polymer of the present invention contains: a first polymerization step of continuously supplying and bringing at least a first monomer and a compressive fluid into contact with each other, to thereby allow the first monomer to carry out ring-opening polymerization to continuously generate an intermediate; and a second polymerization step of bringing the intermediate and a second monomer, which is identical to or different from the first monomer in kind, into contact with each other, to thereby allow the intermediate and the second monomer to carry out polymerization.

Advantageous Effects of Invention

The present invention can solve the various problems in the art, achieve the aforementioned object, and provide a method for producing a polymer, which shortens time required for a first polymerization step and efficiently produces a polymer in a short time when a ring-opening polymerizable monomer is ring-opening polymerized at a plurality of divided stages.

DESCRIPTION OF EMBODIMENTS

Method for Producing Polymer

Figure 1:
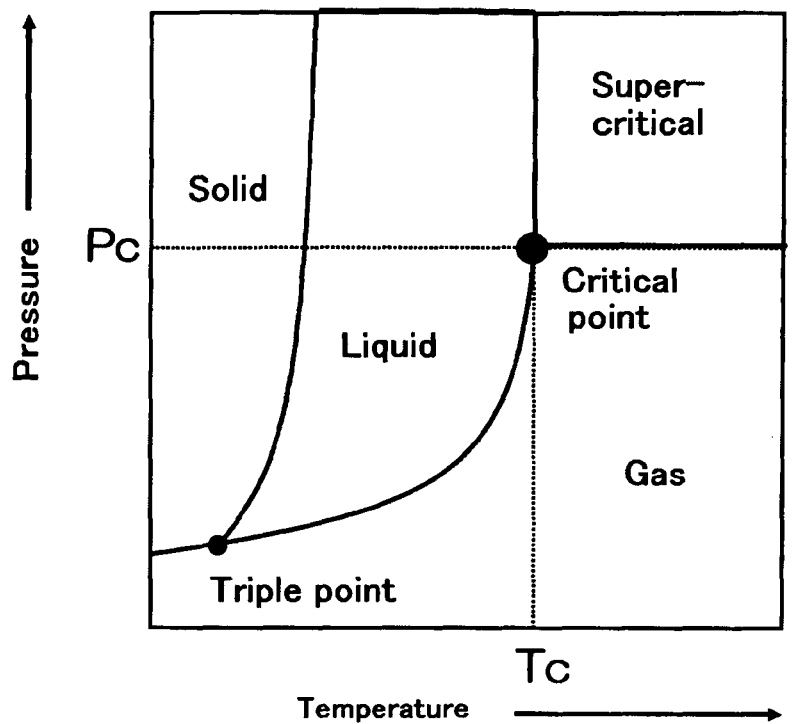
FIG. 1 is a general phase diagram depicting the state of a substance depending on pressure and temperature conditions.

One embodiment of the present invention will be specifically explained hereinafter.

The method for producing a polymer of the present embodiment contains at least a first polymerization step and a second polymerization step, and may further contain appropriately selected other steps.

<First Polymerization Step>

The first polymerization step is a step of continuously supplying and bringing at least a first monomer and a compressive fluid into contact with each other, to thereby allow the first monomer to carry out ring-opening polymerization to continuously generate an intermediate.

<Second Polymerization Step>

The second polymerization step is a step of bringing the intermediate and a second monomer, which is identical to or different from the first monomer in kind, into contact with each other, to thereby allow the intermediate and the second monomer to carry out polymerization.

—Raw Materials—

Substances, such as a monomer, used as raw materials in the aforementioned production method will be explained.

In the present embodiment, the raw materials are materials for producing a polymer and are materials that become constitutional components of a polymer. Moreover, the raw materials contain a first monomer, which is ring-opening polymerizable, and a second monomer, and may further contain appropriately selected optional substances, such as an initiator, and additives.

——Monomer——

The first monomer used in the method for producing a polymer of the present embodiment is a monomer that is ring-opening polymerizable (ring-opening polymerizable monomer). Being ring-opening polymerizable means being able to perform ring-opening polymerization.

The second monomer used in the method for producing a polymer of the present embodiment may be or may not be a ring-opening polymerizable monomer. The first monomer and the second monomer may be identical to or different from each other in kind. Monomers identical to each other in kind refer to monomers having the same chemical composition and the same steric configuration. Note that, optical isomers (e.g., D-lactide and L-lactide), having the same chemical composition but different steric configurations, can be said as monomers different from each other in kind.

In the method for producing a polymer of the present embodiment, when the first monomer and the second monomer are identical to each other in kind, the monomers identical to each other in kind are polymerized at a plurality of divided stages to produce a polymer.

When the first monomer and the second monomer are optical isomers to each other (i.e., the first monomer and the second monomer are different from each other in kind), a stereo block copolymer is produced. Also, when the first monomer and the second monomer are different from each other in kind, a block polymer is produced.

——Ring-Opening Polymerizable Monomer——

The ring-opening polymerizable monomer used as the first monomer or the second monomer in the method for producing a polymer of the present embodiment is appropriately selected depending on the intended purpose without any limitation, and although it may depend on a combination of the ring-opening polymerizable monomer and a compressive fluid, the ring-opening polymerizable monomer is preferably a monomer having a ring structure containing a carbonyl skeleton, such as an ester bond. The carbonyl bond is formed with oxygen, which has high electronegativity, and carbon bonded together with a π-bond. Because of electrons of the π-bond, oxygen is negatively polarized, and carbon is positively polarized, and therefore enhances reactivity. In the case where the compressive fluid is carbon dioxide, it is assumed that affinity between carbon dioxide and a generated polymer is high, as the carbonyl skeleton is similar to the structure of carbon dioxide. As a result of these functions, a plasticizing effect of the generated polymer using the compressive fluid is enhanced. Examples of such ring-opening polymerizable monomer having a ring structure containing a carbonyl skeleton include cyclic ester, and cyclic carbonate.

The cyclic ester is not particularly limited, but it is preferably a cyclic dimer obtained through dehydration-condensation of an L-form and/or D-form of a compound represented by General Formula 1.

$$R—C^*—H(—OH)(—COOH)$$ General Formula 1

In General Formula 1, R is a C1-C10 alkyl group, and "C*" represents an asymmetric carbon.

Specific examples of the compound represented by General Formula 1 include enantiomers of lactic acid, enantiomers of 2-hydroxybutanoic acid, enantiomers of 2-hydroxypentanoic acid, enantiomers of 2-hydroxyhexanoic acid, enantiomers of 2-hydroxyheptanoic acid, enantiomers of 2-hydroxyoctanoic acid, enantiomers of 2-hydroxynonanoic acid, enantiomers of 2-hydroxydecanoic acid, enantiomers of 2-hydroxyundecanoic acid, and enantiomers of 2-hydroxydodecanoic acid. Among them, enantiomers of lactic acid are preferable since they are highly reactive and readily available. These cyclic dimers may be used independently or in combination.

Examples of the cyclic ester other than the compound represented by General Formula 1 include aliphatic lactone, such as β-propiolactone, β-butyrolactone, γ-butyrolactone, γ-hexanolactone, γ-octanolactone, δ-valerolactone, δ-hexanolactone, δ-octanolactone, ε-caprolactone, δ-dodecanolactone, α-methyl-γ-butyrolactone, β-methyl-δ-valerolactone, glycolide and lactide. Among them, ε-caprolactone is particularly preferable since it is highly reactive and readily available.

The cyclic carbonate is not particularly limited, and examples thereof include ethylene carbonate, and propylene carbonate. These ring-opening polymerizable monomers may be used independently, or in combination.

——Other Monomers——

In the present embodiment, other monomers used as the second monomer than the ring-opening polymerizable monomer are appropriately selected from known monomers depending on the intended purpose without any limitation. Examples of the other monomers include isocyanate compounds and glycidyl compounds.

The isocyanate compound is not particularly limited, and examples thereof include a conventionally known polyfunctional isocyanate compound, such as isophorone diisocyanate, hexamethylene diisocyanate, lysine diisocyanate, xylene diisocyanate, tolylene diisocyanate, diphenylmethane diisocyanate, and cyclohexane diisocyanate.

The glycidyl compound is not particularly limited, and examples thereof include a conventionally known polyfunctional glycidyl compound, such as diethylene glycol diglycidyl ether, polyethylene glycol diglycidyl ether, neopentyl glycol diglycidyl ether, 1,6-hexanediol diglycidyl ether, and diglycidyl terephthalate.

—Catalyst—

In the present embodiment, a catalyst is suitably used. The catalyst is appropriately selected depending on the intended purpose without any limitation, and it may be a metal catalyst containing a metal atom or an organic catalyst free from a metal atom.

The metal catalyst is appropriately selected from conventional metal catalysts depending on the intended purpose without any limitation, and examples thereof include: a tin compound, such as tin octylate, tin dibutylate, and tin di(2-ethylhexanoate); an aluminum compound, such as aluminum acetylacetonate, and aluminum acetate; a titanium compound, such as tetraisopropyl titanate, and tetrabutyl titanate; a zirconium compound, such as zirconium isopropoxide; and an antimony compound, such as antimony trioxide.

The catalyst used in the present embodiment is preferably an organic catalyst free from a metal atom (an organic compound free from a metal atom) for applications which require safety and stability of a generated product. In the present embodiment, using an organic catalyst free from a metal atom as a catalyst is preferred since time required for polymerization reaction can be shortened as compared with the case where a ring-opening polymerizable monomer is ring-opening polymerized by a conventional production method using an organic catalyst free from a metal atom, to thereby provide a polymer production method excellent in polymerization rate. In the present embodiment, the organic catalyst free from a metal atom may be any organic catalyst, provided that it contributes to a ring-opening reaction of the ring-opening polymerizable monomer to form an active intermediate together with the ring-opening polymerizable monomer, and it then can be removed and regenerated through a reaction with alcohol.

The organic catalyst free from a metal atom is appropriately selected depending on the intended purpose without any limitation, but it is preferably a (nucleophilic) compound having basicity and serving as a nucleophilic agent, more preferably a basic nucleophilic nitrogen-containing compound (nitrogen compound), and even more preferably a basic nucleophilic nitrogen-containing cyclic compound. Note that, the nucleophilic agent (nucleophilicity) is chemical species (and characteristics thereof) that react with an electrophile. The aforementioned compound is not particularly limited, and examples thereof include cyclic monoamine, cyclic diamine (a cyclic diamine compound having an amidine skeleton), a cyclic triamine compound having a guanidine skeleton, a heterocyclic aromatic compound containing a nitrogen atom, N-heterocyclic carbine. Note that, a cationic organic catalyst is used for the ring-opening polymerization reaction, but the cationic organic catalyst takes hydrogen off (back-biting) from a principle chain of a polymer and therefore a molecular weight distribution of a resulting polymer product becomes wide and it is difficult to obtain the polymer product having high molecular weight.

Examples of the cyclic monoamine include quinaclidone. Examples of the cyclic diamine include 1,4-diazabicyclo[2.2.2]octane (DABCO) and 1,5-diazabicyclo(4,3,0)-5-nonene. Examples of the cyclic diamine compound having a diamine skeleton include 1,8-diazabicyclo[5.4.0]undec-7-ene (DBU) and diazabicyclononene. Examples of the cyclic triamine compound having a guanidine skeleton include 1,5,7-triazabicyclo[4.4.0]dec-5-ene (TBD) and diphenylguanidine (DPG).

Examples of the heterocyclic aromatic compound containing a nitrogen atom include N,N-dimethyl-4-aminopyridine (DMAP), 4-pyrrolidinopyridine (PPY), pyrrocolin, imidazole, pyrimidine and purine. Examples of the N-heterocyclic carbine include 1,3-di-tert-butylimidazol-2-ylidene (ITBU). Among them, DABCO, DBU, DPG, TBD, DMAP, PPY, and ITBU are preferable, as they have high nucleophilicity without being greatly affected by steric hindrance, or they have such boiling points that they can removed under the reduced pressure.

Among these organic catalysts free from metal atoms, for example, DBU is liquid at room temperature, and has a boiling point. In the case where such organic catalyst free from a metal atom is selected for use, the organic catalyst can be removed substantially quantitatively from the obtained polymer by treating the polymer under the reduced pressure. Note that, the type of the organic solvent, or whether or not a removal treatment is performed, is determined depending on an intended use of a generated polymer product.

An amount and type of the organic catalyst for use cannot be determined unconditionally as they vary depending on a combination of the compressive fluid and the ring-opening polymerizable monomer for use, but the amount thereof is preferably 0.01 mol % to 15 mol %, more preferably 0.1 mol % to 1 mol %, and even more preferably 0.3 mol % to 0.5 mol %, relative to 100 mol % of the ring-opening polymerizable monomer. When the amount thereof is smaller than 0.01 mol %, the organic catalyst is deactivated before completion of the polymerization reaction, and as a result a polymer having a target molecular weight cannot be obtained in some cases. When the amount thereof is greater than 15 mol %, it may be difficult to control the polymerization reaction.

———Optional Substances———

In the production method of the present embodiment, other than the aforementioned monomers, a ring-opening polymerization initiator (initiator) and other additives can be used as optional substances of the raw materials.

———Initiator———

In the present embodiment, an initiator is suitable used for controlling a molecular weight of a polymer as obtained. As for the initiator, a conventional initiator can be used. The initiator may be, for example, aliphatic mono or di alcohol, or polyhydric alcohol, as long as it is alcohol-based, and may be either saturated or unsaturated. Specific examples of the initiator include: monoalcohol such as methanol, ethanol, propanol, butanol, pentanol, hexanol, heptanol, nonanol, decanol, lauryl alcohol, myristyl alcohol, cetyl alcohol, and stearyl alcohol; dialcohol such as ethylene glycol, 1,2-propanediol, 1,3-propanediol, 1,3-butanediol, 1,4-butanediol, hexanediol, nonanediol, tetramethylene glycol, and polyethylene glycol; polyhydric alcohol such as glycerol, sorbitol, xylitol, ribitol, erythritol, and triethanol amine; and others such as methyl lactate, and ethyl lactate.

Moreover, a polymer having an alcohol residue at a terminal thereof, such as polycaprolactonediol and polytetramethylene glycol, may be used as the initiator. A use of such polymer enables to synthesize diblock copolymers or triblock compolymers.

An amount of the initiator may be appropriately adjusted depending on the intended molecular weight of a resulting polymer, but it is preferably 0.05 mol % to 5 mol %, relative to 100 mol % of the first monomer. In order to prevent a reaction from being initiated unevenly, the initiator is preferably sufficiently mixed with the first monomer before the first monomer is brought into contact with a polymerization catalyst.

———Additive———

Moreover, an additive may be added for the ring-opening polymerization, if necessary. Examples of the additive include a surfactant, an antioxidant, a stabilizer, an anticlouding agent, a UV ray-absorber, a pigment, a colorant, inorganic particles, various fillers, a thermal stabilizer, a flame retardant, a crystal nucleating agent, an antistatic agent, a surface wet improving agent, an incineration adjuvant, a lubricant, a natural product, a releasing agent, a plasticizer, and other similar components. If necessary, a polymerization terminator (e.g., benzoic acid, hydrochloric acid, phosphoric acid, metaphosphoric acid, acetic acid and lactic acid) may be used after completion of polymerization reaction. An amount of the additives varies depending on intended purpose for adding the additive, or a type of the additives, but it is preferably 0 parts by mass to 5 parts by mass, relative to 100 parts by mass of the polymer composition.

The surfactant for use is preferably a surfactant which is dissolved in the compressive fluid, and has compatibility to both the compressive fluid and the ring-opening polymerizable monomer. Use of such surfactant can give effects that the polymerization reaction can be uniformly preceded, and the resultant polymer has a narrow molecular weight distribution and be easily produced as particles. When the surfactant is used, the surfactant may be added to the compressive fluid, or may be added to the ring-opening polymerizable monomer. In the case where carbon dioxide is used as the compressive fluid, for example, a surfactant having groups having affinity with carbon dioxide and groups having affinity with the monomer can be used. Examples of such surfactant include a fluorosurfactant, and a silicone surfactant.

As for the stabilizer, used are epoxidized soybean oil, and carbodiimide. As for the antioxidant, 2,6-di-t-butyl-4-methyl phenol, and butylhydroxyanisol are used. As for the anti-clouding agent, glycerin fatty acid ester, and monostearyl citrate are used. As for the filler, a thermal stabilizer, a flame retardant, an internal mold release agent, and inorganic additives having an effect of a crystal nucleus agent (e.g., clay, talc, and silica) are used. As for the pigment, titanium oxide, carbon black, and ultramarine blue are used.

—Compressive Fluid—

Figure 2:
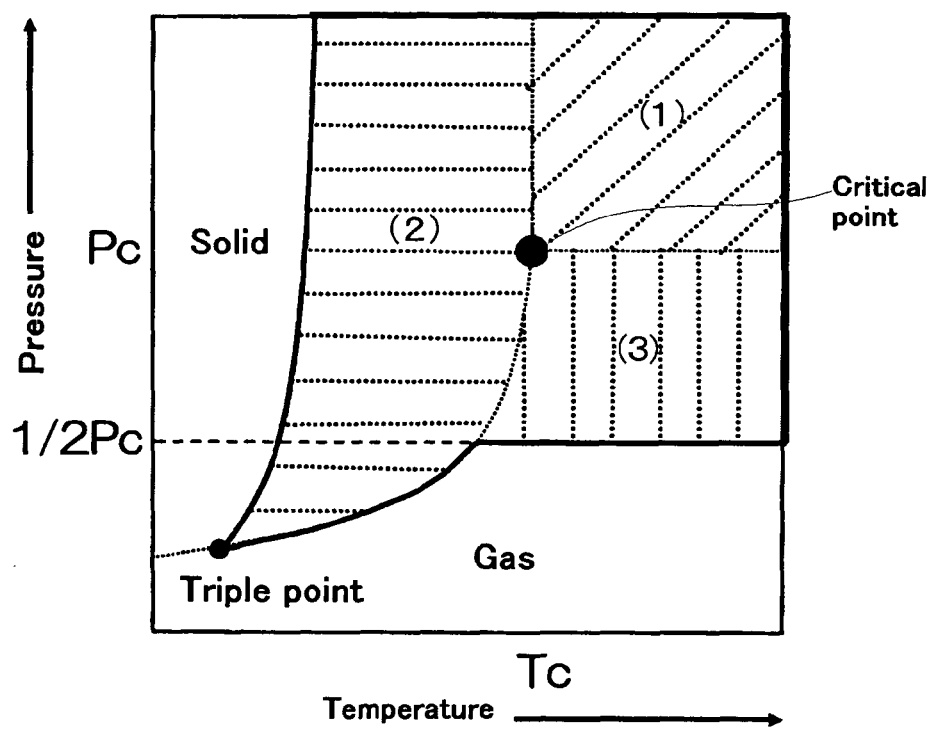
FIG. 2 is a phase diagram which defines a compressive fluid used in the present invention.

Next, a compressive fluid for use in the method for producing a polymer of the present embodiment is explained with reference to FIGS. 1 and 2. FIG. 1 is a phase diagram depicting the state of a substance depending on pressure and temperature conditions. FIG. 2 is a phase diagram which defines a compressive fluid used in the present embodiment. In the present embodiment, the term "compressive fluid" refers to a state of a substance present in any one of the regions (1), (2) and (3) of FIG. 2 in the phase diagram of FIG. 1.

In such regions, the substance is known to have extremely high density and show different behaviors from those shown at normal temperature and normal pressure. Note that, a substance is a supercritical fluid when it is present in the region (1). The supercritical fluid is a fluid that exists as a noncondensable high-density fluid at temperature and pressure exceeding the corresponding critical points, which are limiting points at which a gas and a liquid can coexist. When a substance is in the region (2), the substance is a liquid, but in the present embodiment, it is a liquefied gas obtained by compressing a substance existing as a gas at normal temperature (25° C.) and ambient pressure (1 atm). When a substance is in the region (3), the substance is in the state of a gas, but in the present invention, it is a high-pressure gas whose pressure is ½ or higher than the critical pressure (Pc), i.e. ½Pc or higher.

Examples of a substance that can be used in the state of the compressive fluid include carbon monoxide, carbon dioxide, dinitrogen oxide, nitrogen, methane, ethane, propane, 2,3-dimethylbutane, and ethylene. Among them, carbon dioxide is preferable because the critical pressure and critical temperature of carbon dioxide are respectively about 7.4 MPa, and about 31° C., and thus a supercritical state of carbon dioxide is easily formed. In addition, carbon dioxide is non-flammable, and therefore it is easily handled. These compressive fluids may be used independently, or in combination.

Conventionally, supercritical carbon dioxide is considered unusable as a solvent for living anionic polymerization, since carbon dioxide is reactive with a nucleophilic compound having basicity (see "The Latest Applied Technology of Supercritical Fluid" (CHO RINKAI RYUTAI NO SAISHIN OUYOU GIJUTSU)," p. 173, published by NTS Inc. on Mar. 15, 2004). The present inventors, however, have overcome this conventional finding. That is, it has been found that a nucleophilic organic catalyst having basicity stably coordinates with a ring-opening polymerizable monomer to open the ring thereof, and the polymerization reaction quantitatively proceeds in a short time and as a result proceeds in a living manner even in supercritical carbon dioxide. Here, the wording "a reaction proceeds in a living manner" means that the reaction quantitatively proceeds without involving side reactions such as migration reaction and termination reaction, and the produced polymer has a narrow molecular weight distribution (monodispersity).

<<Device for Producing Polymer>>

A device for producing a polymer of the present embodiment contains: a reaction section through which a compressive fluid passes, where the reaction section contains: a first monomer inlet disposed at an upstream side of the reaction section, and configured to introduce a first monomer which is ring-opening polymerizable; a catalyst inlet disposed at a downstream side of the reaction section with respect to the first monomer inlet, and configured to introduce a catalyst; a second monomer inlet disposed at a downstream side of the reaction section with respect to the catalyst inlet, and configured to introduce a second monomer; and a polymer outlet disposed at a downstream side of the reaction section with respect to the second monomer inlet, and configured to discharge a polymer obtained through polymerization of the second monomer and an intermediate which is obtained through polymerization of the first monomer. If necessary, the device for producing a polymer further contains other members.

The aforementioned method for producing a polymer can be suitably carried out by the device for producing a polymer.

The reaction section may contain a first reaction section and a second reaction section.

The first reaction section contains: a first monomer inlet disposed at an upstream side of the first reaction section, and configured to introduce a first monomer which is ring-opening polymerizable; a catalyst inlet disposed at a downstream side of the first reaction section with respect to the first monomer inlet, and configured to introduce a catalyst; and an intermediate outlet disposed at a downstream side of the first reaction section with respect to the catalyst inlet, and configured to discharge an intermediate obtained through polymerization of the first monomer. If necessary, the first reaction section further contains other members.

The second reaction section contains: a second monomer inlet disposed at an upstream side of the second reaction section, and configured to introduce a second monomer; an intermediate inlet disposed at an upstream side of the second reaction section, and configured to introduce the intermediate obtained through polymerization of the first monomer; a polymer outlet disposed at a downstream side of the second reaction section with respect to the second monomer inlet, and configured to discharge a polymer obtained through polymerization of the intermediate and the second monomer. If necessary, the second reaction section further contains other members. The second reaction section may contain a second catalyst inlet disposed at a downstream side of the second reaction section with respect to the second monomer inlet, and configured to introduce a second catalyst.

Moreover, the device for producing a polymer is preferably a tubular device for continuously producing a polymer, which contains a first monomer inlet for introducing a first monomer which is ring-opening polymerizable at one end of the device (at the aforementioned upstream side); a polymer outlet disposed at the other end of the device and configured to discharge a polymer obtained through polymerization of the second monomer and an intermediate which is obtained through polymerization of the first monomer; a compressive fluid inlet for introducing a compressive fluid at the aforementioned one end of the device; a catalyst inlet for introducing a catalyst and disposed between the aforementioned one end and the other end of the device; and a second monomer inlet for introducing a second monomer and disposed between the aforementioned catalyst inlet and the other end of the device.

Figure 3:
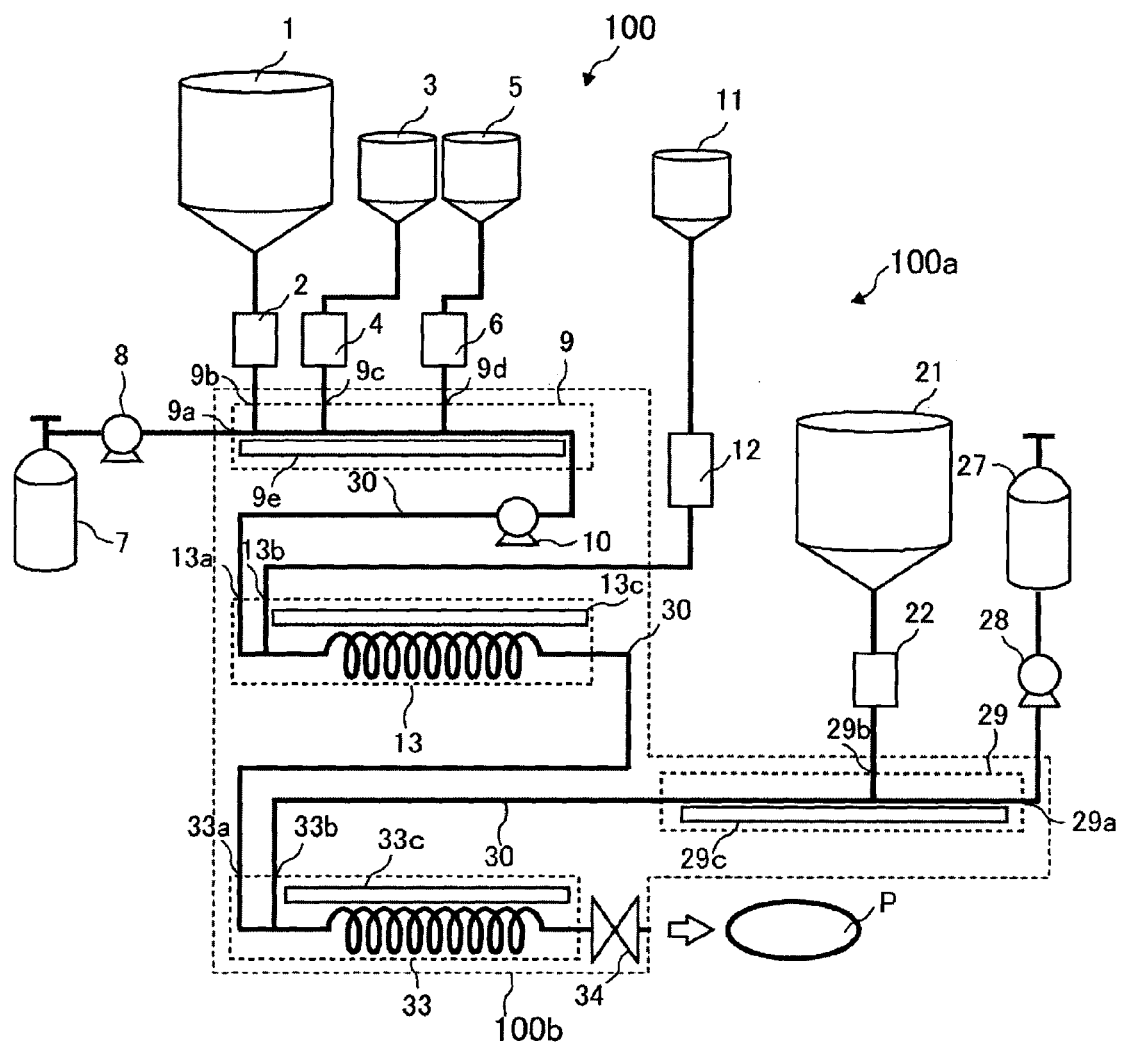
FIG. 3 is a system diagram illustrating one example of a polymerization step used in the present invention.

A polymerization reaction device containing the device for producing a polymer and suitably used in the method for producing a polymer of the present embodiment will be explained with reference to FIG. 3 next. FIG. 3 is a system diagram illustrating one example of the polymerization step in the present embodiment. The polymerization step in this embodiment is a continuous-type step. In the system diagram of FIG. 3, the polymerization reaction device 100 contains: a supply unit 100a for supplying raw materials, such as a ring-opening polymerizable monomer, and a compressive fluid; and a main body of the polymerization reaction device 100b configured to allow the ring-opening polymerizable monomer supplied by the supply unit 100a to carry out polymerization.

The supply unit 100a contains tanks (1, 3, 5, 7, 11, 21, 27), metering feeders (2, 4, 22), and metering pumps (6, 8, 12, 28).

The tank 1 of the supply unit 100a stores the ring-opening polymerizable monomer as the first monomer. The ring-opening polymerizable monomer to be stored may be a powder or liquid. The tank 3 stores solid (powderous or granular) materials among the initiator and additives. The tank 5 stores liquid materials among the initiator and additives. In one possible alternative manner, a part or all of the initiator and additives are mixed with the ring-opening polymerizable monomer in advance and the resultant mixture is stored in the tank 1. The tank 7 stores the compressive fluid. The tank 11 stores the catalyst. The tank 21 stores the second monomer. The tank 27 stores the compressive fluid. The compressive fluid stored in the tank 27 is not particularly limited but is preferably the same as the compressive fluid stored in the tank 7 in order for the polymerization reaction to uniformly proceed. Note that, the tanks (7, 27) may store a gas or solid that becomes a compressive fluid by application of heat or pressure during the process of being supplied to the main body of the polymerization reaction device 100b, or in the main body of the polymerization reaction device 100b. In this case, the gas or solid stored in the tanks (7, 27) may be formed in the state of (1), (2), or (3) depicted in the phase diagram of FIG. 2, within the main body of the polymerization reaction device 100b upon application of heat or pressure.

The metering feeder 2 measures the ring-opening polymerizable monomer stored in the tank 1 and continuously supplies the measured ring-opening polymerizable monomer to the main body of the polymerization reaction device 100b. The metering feeder 4 measures the solid materials stored in the tank 3 and continuously supplies the measured solid materials to the main body of the polymerization reaction device 100b. The metering pump 6 measures the liquid materials stored in the tank 5 and continuously supplies the measured liquid materials to the main body of the polymerization reaction device 100b. The metering pump 8 continuously supplies the compressive fluid stored in the tank 7 at the constant pressure and flow rate into the main body of the polymerization reaction device 100b. The metering pump 12 measures the catalyst stored in the tank 11 and supplies the measured catalyst to the main body of the polymerization reaction device 100b. The metering pump 22 measures the second monomer stored in the tank 21 and continuously supplies the measured second monomer to the main body of the polymerization reaction device 100b. The metering pump 28 continuously supplies the compressive fluid stored in the tank 27 at the constant pressure and flow rate into the main body of the polymerization reaction device 100b. Note that, in the present embodiment, "continuously supply" is a concept in contrast to a method for supplying per batch, and means supplying a respective material in the manner that a polymer polymerized by ring-opening polymerization is continuously obtained. Namely, each material can be supplied intermittently, as long as a polymer polymerized by ring-opening polymerization can be continuously obtained. In the case where the initiator and additives are all solids, the supply unit 100a may not contain the tank 5 and metering pump 6. Similarly, in the case where the initiator and additives are all liquids, the supply unit 100a may not contain the tank 3 and metering feeder 4.

In the present embodiment, the main body of the polymerization reaction device 100b is a tubular device having a first monomer inlet for introducing a first monomer ring-opening polymerizable, which is disposed at one end of the device, and having a polymer outlet discharging a polymer obtained through polymerization of the second monomer and an intermediate obtained through polymerization of the first monomer, which is disposed at the other end of the device. Further, at the one end of the main body of the polymerization reaction device 100b, a compressive fluid inlet for introducing a compressive fluid is further provided, a catalyst inlet for introducing a catalyst is provided between the one end and the other end of the main body, and a second monomer inlet for introducing a second monomer is provided between the catalyst inlet and the other end. Moreover, the main body of the polymerization reaction device 100b also has a contact section 9 at the one end thereof, a reaction section 13, and a reaction section 33 at the other end thereof. The parts or devices equipped with the main body of polymerization reaction device 100b are each connected through a pressure resistant pipe 30 for transporting the raw materials, compressive fluid, or polymer product, as illustrated in FIG. 3. Moreover, each part or device of the main body of the polymerization reaction device 100b contains a tubular member for passing the raw materials therethrough.

The contact section 9 of the main body of polymerization reaction device 100b is a device contains a pressure resistant device or a tube configured to continuously bring the raw materials (e.g. the ring-opening polymerizable monomer, initiator, and additives) continuously supplied from the tanks (1, 3, 5) into contact with the compressive fluid continuously supplied from the tank 7. In the contact section 9, the raw materials are melted or dissolved by bringing the raw materials into contact with a compressive fluid. In the present embodiment, the term "melt" means that raw materials or a generated polymer is plasticized or liquidized with swelling as a result of the contact between the raw materials or generated polymer, and the compressive fluid. Moreover, the term "dissolve" means that the raw materials are dissolved in the compressive fluid. When the ring-opening polymerizable monomer is dissolved, a fluid phase is formed. When the ring-opening polymerizable monomer is melted, a molten phase is formed. It is however preferred that a molten phase or fluid phase be formed with one phase in order to uniformly carry out a reaction.

In the first polymerization step, it is preferred that the first monomer is melted by continuously supplying and bringing the first monomer and the compressive fluid into contact with each other. When ring-opening polymerization is performed on the molten first monomer, a reaction is allowed to proceed with a high ratio of the raw materials, leading to improvement in reaction efficiency. In accordance with the present embodiment, the raw materials, such as a ring-opening polymerizable monomer, and a compressive fluid can be continuously brought into contact with each other at a constant concentration rate in the contact section 9 by continuously supplying the raw material and the compressive fluid. As a result, the raw materials are efficiently melted or dissolved.

The contact section 9 may be provided with a tank-shape stirring device, or a tubular stirring device, but it is preferably a tubular device from one end of which the raw materials are supplied and from the other end of which the mixture, such as a molten phase and a fluid phase, is taken out. Examples of such devices preferably used include a single screw stirring device, a twin-screw stirring device where screws are engaged with each other, a biaxial mixer containing a plurality of stirring elements which are engaged or overlapped with each other, a kneader containing spiral stirring elements which are engaged with each other, or a stick mixer. Among them, the biaxial or multi-axial stirring device stirring elements of which are engaged with each other is more preferable because there is generated a less amount of the depositions of the reaction product onto the stirring device or container, and it has self-cleaning properties. In the case where the contact section 9 is not provided with a stirring device, the contact section 9 is partially composed of a pressure resistant pipe 30. Note that, in the case of the contact section 9 partially composed of the pipe 30, the ring-opening polymerizable monomer supplied to the contact section 9 is preferably turned into liquid in advance to surely mix all the materials in the contact section 9.

The contact section 9 is provided with an inlet 9a for introducing a compressive fluid supplied from the tank 7 by the metering pump 8, an inlet 9b for introducing the ring-opening polymerizable monomer supplied from the tank 1 by the metering feeder 2, an inlet 9c for introducing the powder supplied from the tank 3 by the metering feeder 4, and an inlet 9d for introducing the liquid supplied from the tank 5 by the metering pump 6. In the present embodiment, each inlet (9a, 9b, 9c, 9d) is composed of a connector. The connector is not particularly limited, and is selected from conventional reducers, couplings, Y, T, and outlets. The contact section 9, moreover, contains a heater 9e for heating each of the supplied raw materials and compressive fluid.

A liquid transfer pump 10 is provided between the contact section 9 and the reaction section 13 of the main body of the polymerization reaction device 100b. The liquid transfer pump 10 transfers the raw materials melted or dissolved in the contact section 9 to the reaction section 13.

The reaction section 13 of the main body of the polymerization reaction device 100b is composed of a pressure resistant device or tube for mixing the melted or dissolved raw materials sent by the liquid transfer pump 10, with the catalyst supplied by the metering pump 12, to thereby continuously carry out ring-opening polymerization of the ring-opening polymerizable monomer. The ring-opening polymerizable monomer is ring-opening polymerized in the reaction section 13, whereby a polymer as an intermediate can be produced continuously.

The reaction section 13 may be composed of a tank-shaped mixing device or a tubular mixing device, but it is preferably a tubular device as it gives a less dead space. In the case where the reaction section 13 is provided with a mixing device, polymer particles can be prevented from sedimenting due to a difference in density between the raw materials and the polymer product. Therefore, the polymerization reaction can be carried out more uniformly and quantitatively. Such a device is preferably a dual- or multi-axial stirring device having screws engaging with each other, stirring elements of 2-flights (ellipse), stirring elements of 3-flights (triangle), or circular or multi-leaf shape (clover shape) stirring wings, in view of self-cleaning. In the case where raw materials including the catalyst are sufficiently mixed in advance, a motionless mixer, which divides the flow and compounds (recombines the flows in multiple stages), can also be used as a stirring device. Examples of the motionless mixer include: multiflux batch mixers disclosed in Japanese examined patent application publication (JP-B) Nos. 47-15526, 47-15527, 47-15528, and 47-15533; a Kenics-type (static) mixer disclosed in JP-A No. 47-33166; and motionless mixers similar to those listed without a moving part. In the case where the reaction section 13 is not equipped with a mixing device, the reaction section 13 is composed of a part of a pressure resistant pipe 30. In this case, a shape of the pipe 30 is not particularly limited, but it is preferably a spiral shape in view of downsizing of a device.

The reaction section 13 is provided with an inlet 13a for introducing the raw materials dissolved or melted in the contact section 9, and an inlet 13b, as one example of a catalyst inlet, for introducing the catalyst supplied from the tank 11 by the metering pump 12. In the present embodiment, each inlet (13a, 13b) is composed of a connector. The connector is not particularly limited, and is selected from those known in the art, such as reducers, couplings, Y, T, and outlets. Note that, the reaction section 13 may be provided with a gas outlet for releasing evaporated materials. Moreover, the reaction section 13 contains a heater 13c for heating the transported raw materials.

The main body of the polymerization reaction device 100b is provided with a contact section 29. The contact section 29 is composed of a pressure resistant device or tube for continuously bringing the second monomer supplied from the tank 21 into contact with the compressive fluid supplied from the tank 27, and dissolving or melting the second monomer therein. With this configuration, the second monomer can be supplied to the reaction section 33 in the state of being melted or dissolved. The contact section 29 is provided with an inlet 29a for introducing the compressive fluid supplied from the tank 27 by the metering pump 28 and an inlet 29b for introducing the second monomer supplied from the tank 21 by the metering pump 22. In the present embodiment, each inlet (29a, 29b) is composed of a connector. The connector is not particularly limited, and is selected from conventional reducers, couplings, Y, T, and outlets. Note that, since the configuration of the contact section 29 in the present embodiment is similar to that of the contact section 9, detail explanations thereof are omitted.

The reaction section 33 is composed of a pressure resistant device or tube for bringing the molten or dissolved polymer as an intermediate obtained in the reaction section 13 into contact with the second monomer melted or dissolved in the contact section 29, and continuously polymerizing the intermediate and the second monomer. The contact section 33 is provided with an inlet 33a for introducing the polymer as an intermediate and an inlet 13b for introducing the second monomer melted or dissolved. In the present embodiment, each inlet (33a, 33b) is composed of a connector. The connector is not particularly limited, and is selected from conventional reducers, couplings, Y, T, and outlets. Note that, since the configuration of the reaction section 33 in the present embodiment is similar to that of the reaction section 13, detail explanations thereof are omitted.

A pressure adjustment valve 34 is provided at the edge of the reaction section 33. The pressure adjustment valve 34 sends the polymer product P polymerized in the reaction section 33 out of the reaction section 33 by utilizing a difference between internal pressure and external pressure of the reaction section 33.

FIG. 3 illustrates one exemplary configuration where one reaction section 13 and one reaction section 33 are provided. However, two or more reaction sections 13 and two or more reaction sections 33 may be provided. In the case where two or more reaction sections 13 are provided, the reaction (polymerization) conditions per reaction section, i.e., conditions, such as the temperature, concentration of the catalyst, the pressure, the average retention time, and stirring speed, can be the same as in the case only one reaction section is used, but they are preferably optimized per reaction section corresponding to the progress of the polymerization. Note that, it is not very good idea that excessively large number of reaction sections is connected to give many stages, as it may extend a reaction time, or a device may become complicated. The number of stages is preferably 1 to 4, more preferably 1 to 3.

In the case where polymerization is performed with a small number of reaction sections, a polymerization degree of an obtained polymer or an amount of monomer residues in the polymer are generally unstable, and tend to be varied, and therefore it is not suitable in industrial productions. It is thought that the instability thereof is caused because raw materials having the melt viscosity of a few poises to several tens poises and the polymerized polymer having the melt viscosity of approximately 1,000 poises are present together in the same container. In the present embodiment, compared to the above, the viscosity difference in the reaction section (also referred to as a polymerization system) can be reduced, as the raw materials and polymer product are melted. Therefore, a polymer can be stably produced even when the number of stages is reduced compared to that in the conventional polymerization reaction device.

<<Polymerization Method>>

Next, a polymerization method of a ring-opening polymerizable monomer using the polymerization reaction device 100 will be described. The production method of the present embodiment includes a first polymerization, step of continuously supplying and bringing at least a first monomer and a compressive fluid into contact with each other, to thereby allow the first monomer to carry out ring-opening polymerization to continuously generate an intermediate. The production method of the present embodiment includes a second polymerization step of bringing the intermediate and a second monomer, which is identical to or different from the first monomer in kind, into contact with each other, to thereby allow the intermediate and the second monomer to carry out polymerization.

[First Polymerization Step]

First, the first polymerization step in the method for producing a polymer of the present embodiment will be described. Each of the metering feeders (2, 4), the metering pump 6, and the metering pump 8 is operated to continuously supply a ring-opening polymerizable monomer as the first monomer, initiator, additives, and compressive fluid in the tanks (1, 3, 5, 7). As a result, the raw materials and compressive fluid are continuously introduced into the pipe of the contact section 9 from respective inlets (9a, 9b, 9c, 9d). Note that, the weight accuracy of solid (powder or granular) raw materials may be low compared to that of the liquid raw materials. In this case, the solid raw materials may be melted into a liquid to be stored in the tank 5, and then introduced into the tube of the contact section 9 by the metering pump 6. The order for operating the metering feeders (2, 4) and the metering pump 6 and metering pump 8 are not particularly limited, but it is preferred that the metering pump 8 be operated first because there is a possibility that raw materials are solidified if the initial raw materials are sent to the reaction section 13 without being in contact with the compressive fluid.

The speed for feeding each of the raw materials by the respective metering feeder (2, 4) or metering pump 6 is adjusted based on the predetermined mass ratio of the ring-opening polymerizable monomer, initiator, and additives so that the mass ratio is kept constant. A total mass of each of the raw material supplied per unit time by the metering feeder (2, 4) or metering pump 6 (the feeding speed of the raw materials (g/min)) is adjusted based on desirable physical properties of a polymer or a reaction time. Similarly, a mass of the compressive fluid supplied per unit time by the metering pump 8 (the feeding speed of the compressive fluid (g/min)) is adjusted based on desirable physical properties of a polymer or a reaction time. A ratio (the feeding speed of the raw materials (g/min)/the feeding speed of the compressive fluid (g/min)) of the feeding speed of the raw material to the feeding speed of the compressive fluid, so called a feeding ratio), is preferably 1 or more, more preferably 3 or more, even more preferably 5 or more, and further more preferably 10 or more. The upper limit of the feeding ratio is preferably 1,000 or lower, more preferably 100 or lower, and even more preferably 50 or lower.

By setting the feeding ratio to 1 or greater, a reaction progresses with the high concentration of the raw materials and a polymer product (i.e., high solid content) when the raw materials and the compressive fluid are sent to the reaction section 13. The solid content in the polymerization system here is largely different from a solid content in a polymerization system where polymerization is performed by dissolving a small amount of a ring-opening polymerizable monomer in a significantly large amount of a compressive fluid in accordance with a conventional production method. The production method of the present embodiment is characterized by that a polymerization reaction progresses efficiently and stably in a polymerization system having a high solid content. Note that, in the present embodiment, the feeding ratio may be set to less than 1. In this case, quality of a polymer product has no problem, but economical efficiency is not satisfactory. When the feeding ratio is greater than 1,000, there is a possibility that the compressive fluid may not sufficiently dissolve the ring-opening polymerizable monomer therein, and the intended reaction does not uniformly progress.

Since the raw materials and the compressive fluid are each continuously introduced into the tube of the contact section 9, they are continuously brought into contact with each other. As a result, each of the raw materials, such as the ring-opening polymerizable monomer, the initiator, and the additives, are dissolved or melted in the contact section 9. In the case where the contact section 9 contains a stirring device, the raw materials and compressive fluid may be stirred. In order to prevent the supplied compressive fluid from turning into gas, the internal temperature and pressure of the tube of the reaction section 13 are controlled to the temperature and pressure both equal to or higher than at least a triple point of the compressive fluid. The control of the temperature and pressure here is performed by adjusting the output of the heater 9e of the contact section 9, or adjusting the supplied amount of the compressive fluid. In the present embodiment, the temperature for melting the ring-opening polymerizable monomer may be the temperature equal to or lower than the melting point of the ring-opening polymerizable monomer under atmospheric pressure. It is assumed that the internal pressure of the contact section 9 becomes high under the influence of the compressive fluid so that the melting point of the ring-opening polymerizable monomer reduces the melting point thereof under the atmospheric pressure. Accordingly, the ring-opening polymerizable monomer is melted in the contact section 9, even when an amount of the compressive fluid is small with respect to the ring-opening polymerizable monomer.

In order to melt or dissolve each of the raw materials efficiently, the timing for applying heat to or stirring the raw materials and compressive fluid in the contact section 9 may be adjusted. In this case, heating or stirring may be performed after bringing the raw materials and compressive fluid into contact with each other, or heating or stirring may be performed while bringing the raw materials and compressive fluid into contact with each other. To ensure melting of the materials, for example, the ring-opening polymerizable monomer and the compressive fluid may be brought into contact with each other after heating the ring-opening polymerizable monomer at the temperature equal to or higher than the melting point thereof. In the case where the contact section 9 is provided with a biaxial mixing device, for example, this may be realized by appropriately setting an alignment of screws, arrangement of inlets (9a, 9b, 9c, 9d), and temperature of the heater 9e of the contact section 9.

In the present embodiment, the additives are supplied to the contact section 9 separately from the ring-opening polymerizable monomer, but the additives may be supplied together with ring-opening polymerizable monomer. Alternatively, the additives may be supplied after completion of a polymerization reaction. In this case, after taking the obtained polymer product out from the reaction section 13, the additive may be added to the polymer product while kneading the mixture of the additives and polymer product.

The raw materials dissolved or melted in the contact section 9 are each sent by the liquid transfer pump 10, and supplied to the reaction section 13 through the inlet 13a. Meanwhile, the catalyst in the tank 11 is measured, a predetermined amount of which is supplied by the metering pump 12 to the reaction section 13 through the inlet 13b. The catalyst can function even at room temperature, and therefore, in the present embodiment, the catalyst is added after melting or dissolving the raw materials in the compressive fluid. In the conventional art, the timing for adding the catalyst has not been discussed in association with the ring-opening polymerization of the ring-opening polymerizable monomer using the compressive fluid. In the present embodiment, in the course of the ring-opening polymerization, the catalyst is added to the polymerization system in the reaction section 13 because of the high activity of the organic catalyst, where the polymerization system contains a mixture of raw materials such as the ring-opening polymerizable monomer and the initiator, sufficiently dissolved or melted in the compressive fluid. When the catalyst is added in the state where the mixture is not sufficiently dissolved or melted, a reaction may unevenly progress.

The raw materials each sent by the liquid transfer pump 10 and the catalyst supplied by the metering pump 12 are sufficiently stirred by a mixer of the reaction section 13, or heated by a heater 13c to the predetermined temperature when transported. As a result, ring-opening polymerization reaction of the ring-opening polymerizable monomer is carried out in the reaction section 13 in the presence of the catalyst, whereby a polymer as an intermediate can be produced continuously.

The lower limit of a temperature during ring-opening polymerization of the ring-opening polymerizable monomer (polymerization reaction temperature) is not particularly limited, but it is preferably 40° C., more preferably 50° C., and even more preferably 60° C. When the polymerization reaction temperature is lower than 40° C., it may take a long time to melt the ring-opening polymerizable monomer in the compressive fluid, depending on the type of the ring-opening polymerizable monomer, or melting of the ring-opening polymerizable monomer may be insufficient, or the activity of the catalyst may be low. As a result, the reaction speed may be reduced during the polymerization, and therefore it may not be able to proceed to the polymerization reaction quantitatively.

The upper limit of the polymerization reaction temperature is not particularly limited, but it is preferably either 150° C., or temperature that is higher than the melting point of the ring-opening polymerizable monomer by 50° C., whichever higher. The upper limit of the polymerization reaction temperature is more preferably 100° C., or temperature that is higher than the melting point of the ring-opening polymerizable monomer by 30° C., whichever higher. The upper limit of the polymerization reaction temperature is still more preferably 90° C., or the melting point of the ring-opening polymerizable monomer, whichever higher. The upper limit of the polymerization reaction temperature is even more preferably 80° C., or temperature that is lower than the melting point of the ring-opening polymerizable monomer by 20° C., whichever higher. When the polymerization reaction temperature is higher than the aforementioned temperature, which is higher than the melting point of the ring-opening polymerizable monomer by 30° C., a depolymerization reaction, which is a reverse reaction of ring-opening polymerization, tends to be caused equilibrately, and therefore the polymerization reaction is difficult to proceed quantitatively. In the case where a ring-opening polymerizable monomer having low melting point, such as a ring opening polymerizable monomer that is liquid at room temperature, is used, the polymerization reaction temperature may be temperature that is higher than the melting point by 50° C. or more to enhance the activity of the catalyst. In this case, however, the polymerization reaction temperature is preferably 150° C. or lower. Note that, the polymerization reaction temperature is controlled by a heater 13c equipped with the reaction section 13, or by externally heating the reaction section 13. When the polymerization reaction temperature is measured, a polymer obtained by the polymerization reaction may be used for the measurement.

In a conventional production method of a polymer using supercritical carbon dioxide, polymerization of a ring-opening polymerizable monomer is carried out using a large amount of supercritical carbon dioxide as supercritical carbon dioxide has low ability of dissolving a polymer. In accordance with the polymerization method of the present embodiment, ring-opening polymerization of a ring-opening polymerizable monomer is performed with a high concentration, which has not been realized in a conventional art, in the course of production of a polymer using a compressive fluid. In the present embodiment, the internal pressure of the reaction section 13 becomes high under the influence of the compressive fluid, and thus glass transition temperature (Tg) of a polymer product becomes low. As a result, the produced polymer product has low viscosity, and therefore a ring-opening reaction uniformly progresses even in the state where the concentration of the polymer is high.

In the present embodiment, the polymerization reaction time (the average retention time in the reaction section 13) is appropriately set depending on a target molecular weight of a polymer product to be produced. Generally, the polymerization reaction time is preferably within 1 hour, more preferably within 45 minutes, and even more preferably within 30 minutes. The production method of the present embodiment can reduce the polymerization reaction time to 20 minutes or shorter. This polymerization reaction time is short, which has not been realized before in polymerization of a ring-opening polymerizable monomer in a compressive fluid.

The pressure for the polymerization, i.e., the pressure of the compressive fluid, may be the pressure at which the compressive fluid supplied by the tank 7 becomes a liquid gas ((2) in the phase diagram of FIG. 2), or high pressure gas ((3) in the phase diagram of FIG. 2), but it is preferably the pressure at which the compressive fluid becomes a supercritical fluid ((1) in the phase diagram of FIG. 2). By making the compressive fluid into the state of a supercritical fluid, melting of the ring-opening polymerizable monomer is accelerated to uniformly and quantitatively progress a polymerization reaction. In the case where carbon dioxide is used as the compressive fluid, the pressure is 3.7 MPa or higher, preferably 5 MPa or higher, more preferably 7.4 MPa or higher, which is the critical pressure or higher, in view of efficiency of a reaction and polymerization rate. In the case where carbon dioxide is used as the compressive fluid, moreover, the temperature thereof is preferably 25° C. or higher from the same reasons to the above.

The moisture content in the reaction section 13 is preferably 4 mol % or less, more preferably 1 mol % or less, and even more preferably 0.5 mol % or less, relative to 100 mol % of the ring-opening polymerizable monomer. When the moisture content is greater than 4 mol %, it may be difficult to control a molecular weight of a resulting product as the moisture itself acts as an initiator. In order to control the moisture content in the polymerization reaction system, an operation for removing moistures contained in the ring-opening polymerizable monomer and other raw materials may be optionally provided as a pretreatment.

[Second Polymerization Step]

Next, the second polymerization step in the method for producing a polymer of the present embodiment will be described. First, the metering feeder 22 and the metering pump 28 are operated to continuously supply the second monomer and the compressive fluid in the tanks (21, 27) and introduce via each inlet (29a, 29b) into the tube of the contact section 29. Since the second monomer and the compressive fluid are continuously introduced into the tube of the contact section 29, the second monomer and the compressive fluid are continuously brought into contact with each other. As a result, the second monomer melts or dissolved in the contact section 29. Note that, the procedure and conditions for introducing the second monomer and the compressive fluid in the second polymerization step are similar to those for introducing the ring-opening polymerizable monomer and the compressive fluid in the first polymerization step, detail explanations thereof are omitted. Note that, when monomers are polymerized at three or more divided stages, devices having a similar configuration to the device used in the second polymerization step are provided, and a third (fourth, fifth, . . . ) polymerization step for polymerizing a third (fourth, fifth, . . . ) monomer may be performed.

In the present embodiment, a ratio between an amount of the ring-opening polymerizable monomer supplied per unit time by the metering feeder 2 in the first polymerization step (feeding amount) and an amount of the second monomer supplied per unit time by the metering feeder 22 in the second polymerization step (feeding amount) is not particularly limited. For example, when the first monomer and the second monomer are different from each other in kind, the amounts of the first and second monomers supplied by the corresponding feeders may be determined depending on the intended molecular weight of each block of a block copolymer obtained.

The molten or dissolved polymer as an intermediate formed in the reaction section 13 is continuously supplied via the inlet 33a into the reaction section 33. Also, the second monomer melted or dissolved in the contact section 29 is continuously supplied via the inlet 33b into the reaction section 33. As a result, the polymer as an intermediate and the second monomer are continuously brought into contact with each other in the reaction section 33. The polymer as an intermediate and the second monomer are thoroughly stirred by the stirring device of the reaction section 33, and heated to a predetermined temperature by a heater 33c. As a result, the polymer as an intermediate and the second monomer are polymerized in the reaction section 33 in the presence of the catalyst contained in the polymer as an intermediate, to thereby obtain a polymer as a final product.

The lower limit of the temperature for the polymerization in the reaction section 33 (polymerization reaction temperature) is not particularly limited, but it is preferably 40° C. When the polymerization reaction temperature is lower than 40° C., it may take a long time to melt the ring-opening polymerizable monomer in the compressive fluid, depending on the type of the ring-opening polymerizable monomer, or melting of the ring-opening polymerizable monomer may be insufficient, or the activity of the catalyst may be low. As a result, the reaction speed may be reduced during the polymerization, and therefore it may not be able to proceed to the polymerization reaction quantitatively. The upper limit of the polymerization reaction temperature is not particularly limited, but it is preferably 100° C. When the polymerization reaction temperature is higher than 100° C., a depolymerization reaction, which is a reverse reaction of ring-opening polymerization, tends to be caused equilibrately, and therefore the polymerization reaction may be difficult to proceed quantitatively.

In the present embodiment, the polymerization reaction time in the reaction section 33 (the average retention time in the reaction section 33) is appropriately set depending on a target molecular weight of a polymer product to be produced. Generally, the polymerization reaction time is preferably within 1 hour, more preferably within 45 minutes, and even more preferably within 30 minutes.

The pressure in the reaction section 33 (polymerization pressure), i.e., the pressure of the compressive fluid, may be the pressure at which the compressive fluid supplied by the tanks (7, 27) becomes a liquid gas ((2) in the phase diagram of FIG. 2), or high pressure gas ((3) in the phase diagram of FIG. 2), but it is preferably the pressure at which the compressive fluid becomes a supercritical fluid ((1) in the phase diagram of FIG. 2).

The polymer product P completed the ring-opening polymerization reaction in the reaction section 33 is discharged outside the reaction section 33 from the pressure adjustment valve 34. The speed for discharging the polymer product P from the pressure adjustment valve 34 is preferably constant so as to keep the internal pressure of the polymerization system filled with the compressive fluid constant, and to yield a uniform polymer product. To this end, the liquid sending system inside the reaction sections (13, 33), the liquid sending system inside the contact sections (9, 29), the feeding speeds of the metering feeders (2, 4, 22) and metering pumps (6, 8, 28) are controlled to maintain the back pressure of the pressure adjustment valve 34 constant. The control system may be an ON-OFF control system, i.e., an intermittent feeding system, but it is in most cases preferably a continuous or stepwise control system where the rational speed of the pump or the like is gradually increased or decreased. Any of these controls realizes to stably provide a uniform polymer product.

In the production method of the present embodiment, by appropriately selecting the first monomer and the second monomer, it is possible to synthesize an intended block copolymer. Hereinafter, a synthesis method of a stereo block copolymer, which is one example of a block copolymer, will be described.

The ring-opening polymerizable monomer (e.g., L-lactide) as the first monomer is polymerized in the reaction section 13, to thereby continuously produce a polymer of the first monomer (poly-L-lactic acid) as an intermediate. Subsequently, the polymer of the first monomer (poly-L-lactic acid), which has been polymerized in the reaction section 13, and the second monomer (D-lactide) are further polymerized in the reaction section 33, whereby a stereo block copolymer (stereo block copolymer of polylactic acid) is produced continuously. This method enables the reaction to proceed at a temperature equal to or lower than the melting point of the ring-opening polymerizable monomer with less ring-opening polymerizable monomer residues. Thus, this method is quite effective since it causes racemization very hardly and produces a polymer through continuous reaction.

The catalyst remained in a polymer product obtained by the present embodiment is removed, if necessary. A method for removing is not particularly limited, but examples thereof include: vacuum distillation in case of a compound having a boiling point; a method for extracting and removing the catalyst using a compound dissolving the catalyst as an entrainer; and a method for absorbing the catalyst with a column to remove the catalyst. In method for removing the catalyst, a system thereof may a batch system where the polymer product is taken out from the reaction section and then the catalyst is removed therefrom, or a continuous processing system where the catalyst is removed in the reaction section 33 without taking the polymer product out of the reaction section 33. In the case of vacuum distillation, the vacuum condition is set based on a boiling point of the catalyst. For example, the temperature in the vacuum is 100° C. to 120° C., and the catalyst can be removed at the temperature lower than the temperature at which the polymer product is depolymerized. If a solvent is used in the process of extraction, it may be necessary to provide a step for removing the solvent after extracting the catalyst. Therefore, it is preferred that a compressive fluid be used as a solvent for the extraction. As for the process of such extraction, conventional techniques used for extracting perfumes may be diverted.

In accordance with the production method of the present embodiment, as described above, it is possible to carry out a polymerization reaction at low temperature as a compressive fluid is used. Accordingly, a depolymerization reaction can be significantly prevented compared to a conventional polymerization method. In the present embodiment as described, the polymerization rate of the first monomer and the second monomer is 96 mol % or greater, preferably 98 mol % or greater. When the polymerization rate is less than 96 mol %, the polymer product does not have satisfactory thermal characteristics to function as a polymer product, and therefore it may be necessary to separately provide an operation for removing a ring-opening polymerizable monomer. Note that, in the present embodiment, the polymerization rate is a ratio of the first and second monomers contributed to generation of a polymer, relative to the total amount of the first and second monomers which are the raw materials. The amount of the monomers contributed to generation of a polymer can be obtained by deducting the amount of the first monomer ring-opening polymerizable and the second monomer which have been unreacted (the amount of ring-opening polymerizable monomer residues) from the amount of the generated polymer.

<<Polymer Product>>

The polymer product of the present embodiment is obtained by the aforementioned method for producing a polymer of the present invention, and the polymer product of the present embodiment is substantially free from an organic solvent, contains ring-opening polymerizable monomer residues in an amount of 2 mol % or less, and has a number average molecular weight of 12,000 or greater.

The number average molecular weight of the polymer product obtained in the present embodiment can be adjusted by adjusting an amount of the initiator. The number average molecular weight thereof is not particularly limited, but it is generally 12,000 to 200,000. When the number average molecular weight thereof is greater than 200,000, productivity is low because of the increased viscosity, which is not economically advantageous. When the number average molecular weight thereof is smaller than 12,000, it may not be preferable because a polymer product may have insufficient strength to function as a polymer. The value obtained by dividing the weight average molecular weight Mw of the polymer product obtained by the present embodiment with the number average molecular weight Mn thereof is preferably in the range of 1.0 to 2.5, more preferably 1.0 to 2.0. When the value thereof is greater than 2.0, it is not preferable as the polymerization reaction may have progressed non-uniformly to produce a polymer product, and therefore it is difficult to control physical properties of the polymer.

The polymer product obtained by the present embodiment is substantially free from an organic solvent, because it is produced by a method without using the organic solvent, and has an extremely small amount of the ring-opening polymerizable monomer residues, which is less than 4 mol % (polymerization rate of the monomer being 96 mol % or higher), preferably less than 2 mol % (polymerization rate of the monomer being 98 mol % or higher), and more preferably 1,000 ppm or lower. Therefore, the polymer product obtained by the present embodiment is excellent in safety and stability. Accordingly, particles obtained in the present embodiment are widely applied in uses such as daily use products, pharmaceutical products, cosmetic products, and electrophotographic toners.

In the present embodiment, the term "organic solvent" means an organic solvent used for ring-opening polymerization and dissolves a polymer obtained through ring-opening reaction. When the polymer product produced through ring-opening reaction is polylactic acid (L-form 100 mol %), examples of the organic solvent include halogen-containing solvents such as chloroform and methylene chloride, and tetrahydrofuran. The phrase "substantially free from an organic solvent" means an amount of an organic solvent in a polymer product is a detection limit or lower when the amount thereof is measured by the following measuring method.

(Measuring Method of Residual Organic Solvent)

To 1 part by mass of a polymer product that is a subject of a measurement, 2 parts by mass of 2-propanol is added, and the resulting mixture is dispersed for 30 minutes by applying ultrasonic waves, followed by storing the resultant over 1 day or longer in a refrigerator (5° C.) to thereby extract the organic solvent in the polymer product. A supernatant liquid thus obtained is analyzed by gas chromatography (GC-14A, SHIMADZU) to determine quantities of organic solvent and monomer residues in the polymer product, to thereby measure a concentration of the organic solvent. The measuring conditions for the analysis are as follows:

Device: SHIMADZU GC-14A
Column: CBP20-M 50-0.25
Detector: FID
Injection amount: 1 µL to 5 µL
Carrier gas: He, 2.5 kg/cm$^2$
Flow rate of hydrogen: 0.6 kg/cm$^2$
Flow rate of air: 0.5 kg/cm$^2$
Chart speed: 5 mm/min
Sensitivity: Range 101×Atten 20
Column temperature: 40° C.
Injection temperature: 150° C.

In the present embodiment, in the case where polymerization is performed using an organic solvent free from a metal atom, a polymer product substantially free from a metal atom is obtained. The phrase "substantially free from a metal atom" refers to not containing a metal atom derived from the metal catalyst. Specifically, a polymer product can be said it is substantially free from a metal atom, when the metal atom derived from the metal catalyst in the polymer product is detected by conventional analysis methods, such as ICP-atomic emission spectrometry, atomic absorption spectrophotometry, and colorimetry, and the result is equal to or lower than the detection limit. Examples of the metal atom derived from the metal catalyst include tin, aluminum, titanium, zirconium, and antimony.

<<Use of Polymer Product>>

The polymer product obtained by the production method of the present embodiment is excellent in safety and stability because it is produced by the method which does not use an organic solvent, and there are hardly any monomer residues therein. Accordingly, the polymer product obtained by the production method of the present embodiment is widely applied for various uses, such as an electrophotographic developer, a printing ink, paints for building, cosmetic products, and medical materials. When the polymer product is used in the aforementioned uses, various additives may be added to the polymer product to improve molding ability, secondary processability, degradability, tensile strength, thermal resistance, storage stability, crystallinity, and weather resistance.

Effect of the Present Embodiments

In the present embodiments mentioned above, a ring-opening polymerizable monomer is subjected to ring-opening polymerization by continuously supplying and bringing at least a ring-opening polymerizable monomer and a compressive fluid into contact with each other, to continuously generate a polymer. In this case, the progress of the reaction is slow at the upstream side of the feeding path of the reaction section 13 of the main body of the polymerization reaction device 100b, and therefore the viscosity within the system is low, and the viscosity within the system is high at the downstream side, as the progress of the reaction is fast. As a result, a local viscosity variation is not generated and therefore the reaction is accelerated. Accordingly, the time required for the polymerization reaction is shortened.

In accordance with the polymerization method of the present embodiment, it is possible to provide a polymer product having excellent mold formability and thermal stability at low cost, with low environmental load, energy saving, and excellent energy saving, because of the following.

(1) A reaction proceeds at low temperature compared to a melt polymerization method in which a reaction is proceeded at high temperature (e.g., 150° C. or higher).

(2) As the reaction proceeds at low temperature, a side reaction hardly occurs, and thus a polymer can be obtained at high yield relative to an amount of the ring-opening polymerizable monomer added (namely, an amount of ring-opening polymerizable monomer residues is small). Accordingly, a purification step for removing the ring-opening polymerizable monomer residues, which is performed for attaining a polymer product having excellent mold formability and thermal stability, can be simplified, or omitted.

(3) As a metal-free organic compound can be selected as a catalyst for use in the production of a polymer, intended use of which does not favor inclusion of a certain metal, it is not necessary to provide a step for removing the catalyst.

(4) In a polymerization method using an organic solvent, it is necessary to perform a treatment for removing an organic solvent to thereby yield a polymer product as a solid. Also, even by performing a treatment for removing an organic solvent, it is difficult to completely remove an organic solvent. In the polymerization method of the present embodiment, a drying step is simplified or omitted, because a waste liquid is not generated. As a compressive fluid is used, a dry polymer product can be obtained with one stage, so that a step of removing an organic solvent can be omitted.

(5) As the compressive fluid is used, a ring-opening polymerization reaction can be performed without an organic solvent.

(6) A uniform proceeding of a polymerization can be achieved because ring-opening polymerization is carried out by adding a catalyst after melting the ring-opening polymerizable monomer with the compressive fluid. Accordingly, the method of the present embodiment can be suitably used when optical isomers or copolymers with other monomers are produced.

In the method for producing a polymer of the present embodiment, in the first polymerization step, the polymerization reaction proceeds in a state where the concentration of the catalyst relative to the ring-opening polymerizable monomer as the first monomer is high, so that the polymerization reaction rapidly proceeds. Since the second monomer is introduced in the second polymerization step, the polymerization reaction proceeds in a state where the concentration of the catalyst relative to the polymer as an intermediate and the second monomer is low. As a result, the polymerization reaction is allowed to proceed under conditions suitable for increasing the molecular weight of a polymer. Note that, by adjusting the feeding amount of the second monomer, the concentration of the catalyst in the second polymerization step can be controlled. This makes it possible to easily control the molecular weigh of a polymer as a final product.

EXAMPLES

The present embodiment will be more specifically explained through Examples and Comparative Examples, but Examples shall not be construed as to limit the scope of the present invention in any way. Note that, molecular weights of polymer products obtained in Examples and Comparative Examples, and amounts of monomer residues were determined in the following manners.

<Measurement of Molecular Weight of Polymer Product>

The molecular weight was measured through gel permeation chromatography (GPC) under the following conditions.
Apparatus: GPC-8020 (product of TOSOH CORPORATION)
Column: TSK G2000HXL and G4000HXL (product of TOSOH CORPORATION)
Temperature: 40° C.
Solvent: Tetrahydrofuran (THF)
Flow rate: 1.0 mL/min First, a calibration curve of molecular weight was obtained using monodispersed polystyrene serving as a standard sample. A polymer sample (1 mL) having a polymer concentration of 0.5% by mass was applied and measured under the above conditions, to thereby obtain the molecular weight distribution of the polymer product. The number average molecular weight Mn and the weight average molecular weight Mw of the polymer were calculated from the calibration curve. The molecular weight distribution is a value calculated by dividing Mw with Mn.

<Polymerization Rate of Monomer>

Polymerization Rate of Lactide

Nuclear magnetic resonance (NMR) spectroscopy of polylactic acid of the polymer product or complex was performed in deuterated chloroform by means of a nuclear magnetic resonance apparatus (JNM-AL300, of JEOL Ltd.). In this case, a ratio of a quartet peak area attributed to lactide (4.98 ppm to 5.05 ppm) to a quartet peak area attributed to polylactic acid (5.10 ppm to 5.20 ppm) was calculated, and an amount of the unreacted monomer (mol %) was determined by multiplying the obtained value from the calculation with 100. The polymerization rate is the value obtained by deducting the calculated amount of the unreacted monomer from 100.

Polymerization Rate of Lactide and ε-Caprolactone

Nuclear magnetic resonance (NMR) spectroscopy of the polylactic acid-polycaprolactone copolymer of the product was performed in deuterated chloroform by means of a nuclear magnetic resonance apparatus (JNM-AL300, of JEOL Ltd.). In this case, a ratio of a quartet peak area attributed to lactide (4.98 ppm to 5.05 ppm) to a quartet peak area attributed to polylactic acid (5.10 ppm to 5.20 ppm) was calculated, and an amount of the unreacted lactide monomer in polylactic acid (mol %) was determined by multiplying the obtained value from the calculation with 100. Also, a ratio of a triplet peak area attributed to polycaprolactone (4.22 ppm to 4.25 ppm) to a triplet peak area attributed to polycaprolactone (4.04 ppm to 4.08 ppm) was calculated, and an amount of the unreacted caprolactone monomer in polylactic acid (mol %) was determined by multiplying the obtained value from the calculation with 100. The polymerization rate is the value obtained by deducting the calculated amount of the unreacted monomer from 100.

Example 1

Ring-opening polymerization of a mixture (90/10) of L-lactide and D-lactide was performed by means of the polymerization reaction device 100 of FIG. 3. The configuration of the polymerization reaction device 100 was as follows.

Tank 1, Metering Feeder 2:

Plunger pump NP-S462, manufactured by Nihon Seimitsu Kagaku Co., Ltd.

The tank 1 was charged with a 99:1 (by mol) mixture of lactide as a ring-opening polymerizable monomer (a mixture of L-lactide and D-lactide (90/10), manufacturer: Purac, melting point: 100° C.) (first monomer) and lauryl alcohol as an initiator. Note that, lactide was turned into liquid by heating it in the tank 1 to a temperature equal to or higher than its melting point.

Tank 3, Metering Feeder 4: Not used in Example 1
Tank 5, Metering Pump 6: Not used in Example 1
Tank 7: Carbonic acid gas cylinder
Tank 27: Carbonic acid gas cylinder
Tank 21, Metering Feeder 22:

Plunger pump NP-S462, manufactured by Nihon Seimitsu Kagaku Co., Ltd.

The tank 21 was charged with lactide as a ring-opening polymerizable monomer (a mixture of L-lactide and D-lactide (mass ratio: 90/10), manufacturer: Purac, melting point: 100° C.) (second monomer). Note that, lactide was turned into liquid by heating it in the tank 21 to a temperature equal to or higher than its melting point.

Tank 11, Metering Pump 12:

Intelligent HPLC pump (PU-2080), manufactured by JASCO Corporation

The tank 11 was charged with 1,8-diazabicyclo[5.4.0]undec-7-ene (DBU, manufacturer: Tokyo Chemical Industry Co., Ltd.) (organic solvent).

Contact Section 9: Biaxial Stirring Device Equipped with Screws Engaged with Each Other
    inside diameter of cylinder: 30 mm
    biaxial rotation with identical directions
    rotational speed: 30 rpm Contact Section 29: Biaxial Stirring Device Equipped with Screws Engaged with Each Other
    inside diameter of cylinder: 30 mm
    biaxial rotation with identical directions
    rotational speed: 30 rpm Reaction Section 13: biaxial kneader
    inside diameter of cylinder: 40 mm
    biaxial rotation with identical directions
    rotational speed: 60 rpm Reaction Section 33: biaxial kneader
    inside diameter of cylinder: 40 mm
    biaxial rotation with identical directions
    rotational speed: 60 rpm The metering feeder 2 was operated to continuously and constantly supply raw materials (lactide and lauryl alcohol) in the tank 1 to the biaxial stirring device of the contact section 9 at 4 g/min. The metering pump 8 was operated to continuously supply carbonic acid gas in the tank 7 to the biaxial stirring device of the contact section 9 so that the amount of the carbonic acid gas was 5 parts by mass relative to 100 parts by mass of the raw materials. In the manner as mentioned, the raw materials including lactide and lauryl alcohol, and the compressive fluid were continuously brought into contact with each other in the biaxial stirring device of the contact section 9, and the raw materials were melted. Note that, the feeding ratio in the contact section 9 (the feeding speed of the raw materials/the feeding speed of the compressive fluid) was 20.

The raw materials melted in the contact section 9 were sent to the biaxial kneader of the reaction section 13 by means of the liquid transfer pump 10. Meanwhile, the metering pump 12 was operated to supply the polymerization catalyst (DBU) stored in the tank 11 to the reaction section 13 so that the amount of the polymerization catalyst was 99:1 (molar ratio) relative to the amount of lactide. In the manner as mentioned, ring-opening polymerization of lactide was continuously performed in the reaction section 13 in the presence of DBU, so that a polymer (polylactic acid) as an intermediate was continuously produced in the reaction section 13.

The metering feeder 22 was operated to continuously and constantly supply lactide, which was the second monomer, stored in the tank 21 to the biaxial stirring device of the contact section 29 at a feeding speed of 4 g/min. Moreover, the metering pump 28 was operated to continuously supply carbonic acid gas in the tank 27 to the biaxial stirring device of the contact section 29 so that the amount of the carbonic acid gas was 5 parts by mass relative to 100 parts by mass of the second monomer. In the manner as mentioned above, the lactide and the compressive fluid were continuously brought into contact with each other and the lactide was melted in the contact section 29. Note that, the feeding ratio in the contact section 29 (the feeding speed of the raw materials/the feeding speed of the compressive fluid) was 20.

The polymer (polylactic acid), as the intermediate product of the melted state polymerized in reaction section 13, and the lactide melted in the contact section 29 were both continuously supplied to the biaxial kneader of the reaction vessel 33. In the manner as mentioned, the polymer as the intermediate product, and the lactide as the second monomer were continuously polymerized in the reaction vessel 33.

Note that, in Example 1, the pressure of the contact section 9, the pressure of the reaction section 13, and the pressure of the reaction section 33 were set to 15 MPa by adjusting the opening and closing degree of the pressure adjustment valve 34. The temperatures of the feeding paths in the biaxial stirring devices of the contact sections (9, 29) were each 100° C. at the inlet, and 60° C. at the outlet. The temperatures of the feeding paths in the biaxial kneaders of the reaction section 13 and the reaction section 33 were each 60° C. at both the inlet and the outlet. Moreover, the average retention time of each raw material in the contact section 9, the reaction section 13 and the reaction section 33 was set to 1,200 seconds by adjusting the length and the piping system of each of the contact section 9, the reaction section 13 and the reaction section 33.

The pressure adjustment valve 34 was provided at the edge the reaction section 33, and a polymer as a product (polylactic acid) was continuously discharged from the pressure adjustment valve 34. Physical properties (Mn, Mw/Mn, polymerization rate) of the obtained polymer product were measured in the methods described above. The results are presented in Table 1.

Examples 2 to 4

Polymer products of Examples 2 to 4 were obtained in the same manner as in Example 1 except that the feed amounts of the raw materials were changed as presented in Table 1. Physical properties of the obtained polymer products were measured in the methods described above. The results are presented in Table 1.

Example 5

A polymer product of Example 5 was obtained in the same manner as in Example 1 except that ε-caprolactone (melting point: −1° C.) was used as the second monomer. Physical properties of the obtained polymer product were measured in the methods described above. The results are presented in Table 1.

Example 6

A polymer product of Example 6 was obtained in the same manner as in Example 1 except that L-lactide (manufacturer: Purac, melting point: 100° C.) was used as the first monomer and D-lactide (manufacturer: Purac, melting point: 100° C.) was used as the second monomer. Physical properties of the obtained polymer product were measured in the methods described above. The results are presented in Table 1.

Example 7

A polymer product of Example 7 was obtained in the same manner as in Example 1 except that the tank 27 and the metering pump 28 were not used. Physical properties of the obtained polymer product were measured in the methods described above. The results are presented in Table 1.

Examples 8 to 10

Polymer products of Examples 8 to 10 were obtained in the same manner as in Example 1 except that the feed amount (feeding ratio) of the compressive fluid was changed as presented in Table 2. Physical properties of the obtained polymer product were measured in the methods described above. The results are presented in Table 2.

Example 11

A polymer product of Example 11 was obtained in the same manner as in Example 1 except that tin di(2-ethylhexanoate) was used as the catalyst, that the temperatures of the feeding paths in the biaxial stirring devices of the contact sections (9, 29) were each 150° C. at both the inlet and the outlet, and that the temperatures of the feeding paths in the biaxial kneaders of the reaction section 13 and the reaction section 33 were each 150° C. at both the inlet and the outlet. Physical properties of the obtained polymer product were measured in the methods described above. The results are presented in Table 2.

Examples 12 and 13

Polymer products of Example 12 and 13 were obtained in the same manner as in Example 11 except that the amount of the initiator was changed as presented in Table 2. Physical properties of the obtained polymer products were measured in the methods described above. The results are presented in Table 2.

Examples 14 and 15

Polymer products of Example 14 and 15 were obtained in the same manner as in Example 11 except that the first monomer and the second monomer were changed as presented in Table 2. Physical properties of the obtained polymer products were measured in the methods described above. The results are presented in Table 2.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| First monomer | | Lactide (racemic mixture) | Lactide (racemic mixture) | Lactide (racemic mixture) | Lactide (racemic mixture) | Lactide (racemic mixture) | L-lactide | Lactide (racemic mixture) |
| Second monomer | | Lactide (racemic mixture) | Lactide (racemic mixture) | Lactide (racemic mixture) | Lactide (racemic mixture) | ε-Caprolactone | D-lactide | Lactide (racemic mixture) |
| Amount of initiator (mol %) | | 1 | 1 | 1 | 1 | 1 | 1 | 1 |
| Feeding speed (g/min) | Metering feeder 2 | 4 | 2 | 1 | 0.5 | 4 | 4 | 4 |
| | Metering feeder 22 | 4 | 6 | 7 | 7.5 | 4 | 4 | 4 |
| Feeding ratio | Contact section 9 | 20 | 20 | 20 | 20 | 20 | 20 | 20 |
| | Contact section 29 | 20 | 20 | 20 | 20 | 20 | 20 | — |
| Internal pressure (MPa) | | 15 | 15 | 15 | 15 | 15 | 15 | 15 |
| Number average molecular weight (Mn) | | 18,000 | 35,000 | 72,000 | 135,000 | 18,000 | 17,000 | 18,000 |
| Molecular weight distribution (Mw/Mn) | | 1.8 | 1.8 | 1.8 | 1.7 | 1.7 | 2.0 | 1.8 |
| Polymerization rate (mol %) | | 100 | 100 | 99 | 99 | 99 | 99 | 100 |

TABLE 2

|  |  | Ex. 8 | Ex. 9 | Ex. 10 | Ex. 11 | Ex. 12 | Ex. 13 | Ex. 14 | Ex. 15 |
|---|---|---|---|---|---|---|---|---|---|
| First monomer | | Lactide (racemic mixture) | Lactide (racemic mixture) | Lactide (racemic mixture) | Lactide (racemic mixture) | Lactide (racemic mixture) | Lactide (racemic mixture) | L-lactide | Lactide (L-form) |
| Second monomer | | Lactide (racemic mixture) | Lactide (racemic mixture) | Lactide (racemic mixture) | Lactide (racemic mixture) | Lactide (racemic mixture) | Lactide (racemic mixture) | ε-Capro-lactone | Glycolide |
| Amount of initiator (mol %) | | 1 | 1 | 1 | 1 | 0.5 | 0.1 | 1 | 1 |
| Feeding speed (g/min) | Metering feeder 2 | 4 | 4 | 4 | 4 | 4 | 4 | 4 | 4 |
| | Metering feeder 22 | 4 | 4 | 4 | 4 | 4 | 4 | 4 | 2 |
| Feeding ratio | Contact section 9 | 3 | 10 | 50 | 20 | 20 | 20 | 20 | 20 |
| | Contact section 29 | 3 | 10 | 50 | 20 | 20 | 20 | 20 | 20 |
| Internal pressure (MPa) | | 15 | 15 | 15 | 15 | 15 | 15 | 15 | 15 |
| Number average molecular weight (Mn) | | 19,000 | 18,000 | 20,000 | 15,000 | 30,000 | 16,000 | 14,000 | 15,000 |
| Molecular weight distribution (Mw/Mn) | | 1.8 | 1.8 | 1.8 | 1.9 | 1.9 | 2.1 | 2.0 | 1.9 |
| Polymerization rate (mol %) | | 100 | 100 | 100 | 100 | 100 | 99 | 99 | 99 |

Aspects of the present invention are as follows, for example.

<1> A method for producing a polymer, including:

(i) continuously supplying and bringing at least a first monomer, which is ring-opening polymerizable, and a compressive fluid into contact with each other, to thereby allow the first monomer to carry out ring-opening polymerization to continuously generate an intermediate; and (ii) bringing the intermediate and a second monomer, which is identical to or different from the first monomer in kind, into contact with each other, to thereby allow the intermediate and the second monomer to carry out polymerization.

<2> The method for producing a polymer according to <1>, wherein the (i) contains continuously supplying raw materials containing the first monomer, and the compressive fluid under the following conditions, to thereby bring the raw materials and the compressive fluid into contact with each other:

$$\frac{\text{Feeding speed of the raw materials (g/min)}}{\text{Feeding speed of the compressive fluid (g/min)}} \geq 1$$

<3> The method for producing a polymer according to <1> or <2>, wherein the continuously supplying and bringing the first monomer and the compressive fluid into contact with each other makes the first monomer melt.

<4> The method for producing a polymer according to any one of <1> to <3>, wherein the first monomer is allowed to carry out the ring-opening polymerization in the presence of an organic catalyst free from a metal atom.

<5> The method for producing a polymer according to any one of <1> to <4>, wherein a lower limit of a temperature during the ring-opening polymerization in the (i) is 40° C., and an upper limit of the temperature during the ring-opening polymerization in the (i) is 150° C., or a temperature that is higher than a melting point of the first monomer by 50° C., whichever higher.

<6> The method for producing a polymer according to any one of <1> to <5>, wherein a polymerization rate of each of the first monomer and the second monomer is 98 mol % or higher.

<7> The method for producing a polymer according to any one of <1> to <6>, wherein the polymer has a number average molecular weight of 12,000 or greater.

<8> The method for producing a polymer according to any one of <1> to <7>, wherein the compressive fluid contains carbon dioxide.

<9> The method for producing a polymer according to <4>, wherein the organic catalyst free from a metal atom is a basic nucleophilic nitrogen compound.

<10> The method for producing a polymer according to any one of <1> to <9>, wherein the first monomer is a monomer having a ring structure containing an ester bond therein.

<11> A device for producing a polymer, containing:

a reaction section through which a compressive fluid passes, where the reaction section contains:

a first monomer inlet disposed at an upstream side of the reaction section, and configured to introduce a first monomer which is ring-opening polymerizable;

a catalyst inlet disposed at a downstream side of the reaction section with respect to the first monomer inlet, and configured to introduce a catalyst;

a second monomer inlet disposed at a downstream side of the reaction section with respect to the catalyst inlet, and configured to introduce a second monomer; and a polymer outlet disposed at a downstream side of the reaction section with respect to the second monomer inlet, and configured to discharge a polymer obtained through polymerization of the second monomer and an intermediate which is obtained through polymerization of the first monomer.

REFERENCE SIGNS LIST

1: tank
2: metering feeder

3: tank
4: metering feeder
5: tank
6: metering pump
7: tank
8: metering pump
9: contact section
9*a*: inlet (one example of a compressive fluid inlet)
9*b*: inlet (one example of an inlet for the first monomer)
10: liquid transfer pump
11: tank
12: metering pump
13: reaction section
13*a*: inlet
13*b*: inlet (one example of a catalyst inlet)
21: tank
22: metering feeder
27: tank
28: metering pump
29: contact section
33: reaction section
33*a*: inlet
33*b*: inlet (one example of an inlet for the second monomer)
34: pressure adjustment valve
100: polymerization reaction device
100*a*: supply unit
100*b*: polymerization reaction device (one example of a device for continuously producing a polymer)
P: polymer product

The invention claimed is:

1. A method for producing a polymer, comprising:
   (i) continuously supplying and bringing a first monomer, which is ring-opening polymerizable, a catalyst, and a first compressive fluid into contact with each other, to thereby allow the first monomer to carry out ring-opening polymerization and to continuously generate a composition comprising an intermediate; and
   (ii) continuously supplying and bringing a second monomer, which is identical to the first monomer, and a second compressive fluid which is identical to the first compressive fluid into contact with the composition comprising the intermediate, to thereby allow the intermediate and the second monomer to carry out polymerization and produce said polymer.

2. The method for producing a polymer according to claim 1, wherein in (i) the first monomer and the compressive fluid are continuously supplied under the following conditions, to thereby bring the first monomer and the first compressive fluid into contact with each other:

$$\frac{\text{Feeding speed of the first monomer (g/min)}}{\text{Feeding speed of the first compressive fluid (g/min)}} \geq 1.$$

3. The method for producing a polymer according to claim 1, wherein the continuously supplying and bringing the first monomer and the first compressive fluid into contact with each other makes the first monomer melt.

4. The method for producing a polymer according to claim 1, wherein the catalyst is an organic catalyst free from a metal atom.

5. The method for producing a polymer according to claim 1, wherein a lower limit of a temperature during the ring-opening polymerization in (i) is 40° C., and an upper limit of the temperature during the ring-opening polymerization in (i) is 150° C., or a temperature that is higher than a melting point of the first monomer by 50° C., whichever higher.

6. The method for producing a polymer according to claim 1, wherein a monomer conversion amount of each of the first monomer and the second monomer is 98 mol % or higher.

7. The method for producing a polymer according to claim 1, wherein the polymer has a number average molecular weight of 12,000 or greater.

8. The method for producing a polymer according to claim 1, wherein the compressive fluid comprises carbon dioxide.

9. The method for producing a polymer according to claim 4,
   wherein the organic catalyst free from a metal atom is a basic nucleophilic nitrogen compound.

10. The method for producing a polymer according to claim 1, wherein the first monomer is a monomer having a ring structure containing an ester bond therein.

11. The method for producing a polymer according to claim 1, wherein the compressive fluid is carbon dioxide and the first and second monomer is L-lactide, D-lactide, or a mixture thereof, and wherein the polymer produced has a number average molecular weight of 12,000-200,000.

12. The method for producing a polymer according to claim 1, wherein the polymer produced is substantially free from an organic solvent, and comprises less than 2 mol % of said monomers.

13. The method for producing a polymer according to claim 1, wherein the polymer produced is substantially free from an organic solvent, and comprises 1,000 ppm or less of said monomers.

14. The method for producing a polymer according to claim 11, wherein the polymer produced is substantially free from an organic solvent, and comprises less than 2 mol % of said monomers.

15. The method for producing a polymer according to claim 11, wherein the polymer produced is substantially free from an organic solvent, and comprises 1,000 ppm or less of said monomers.

* * * * *